(12) United States Patent
Austin

(10) Patent No.: US 6,694,827 B2
(45) Date of Patent: Feb. 24, 2004

(54) FLUID COUPLING WITH A TORQUE INDICATION DEVICE

(75) Inventor: John Austin, Oregon City, OR (US)

(73) Assignee: Crane-Resistoflex Company, Marion, NC (US)

(*) Notice: Subject to any disclaimer, the term of this patent is extended or adjusted under 35 U.S.C. 154(b) by 0 days.

(21) Appl. No.: 09/909,916

(22) Filed: Jul. 20, 2001

(65) Prior Publication Data

US 2002/0023504 A1 Feb. 28, 2002

Related U.S. Application Data

(60) Provisional application No. 60/220,522, filed on Jul. 21, 2000.

(51) Int. Cl.[7] .................................................. G01L 3/02
(52) U.S. Cl. .................... 73/862.323; 285/93; 285/179.1
(58) Field of Search ........................... 285/39, 93, 332, 285/354; 264/328.15; 425/549; 73/862.323

(56) References Cited

U.S. PATENT DOCUMENTS

| | | | | |
|---|---|---|---|---|
| 4,570,981 A | * | 2/1986 | Fournier et al. | ......... 285/332.3 |
| 4,588,367 A | * | 5/1986 | Schad | ........................ 425/549 |
| 5,280,967 A | * | 1/1994 | Varrin, Jr. | ..................... 285/93 |
| 5,507,531 A | * | 4/1996 | Aldridge | ...................... 285/39 |
| 6,368,542 B1 | * | 4/2002 | Steil et al. | ............. 264/328.14 |

* cited by examiner

Primary Examiner—Edward Lefkowitz
Assistant Examiner—Alandra Ellington
(74) Attorney, Agent, or Firm—Fitzpatrick, Cella, Harper & Scinto

(57) ABSTRACT

A fluid coupling capable of indicating proper tightening includes a fitting body having a flared end with a back side. The fitting body also includes an indicator spaced a predetermined distance away from the back side. A threaded nut is positioned around the fitting body adjacent the flared end and includes a back end and a shoulder portion spaced away a predetermined distance therefrom. The shoulder portion is concentrically aligned with the back side of the flared end. The fluid fitting also includes a belleville washer(s) positioned around the fitting body adjacent the back side of the flared end, which is (are) compressed upon threading and torquing of the nut onto the threaded end of a male fitting. When a predetermined amount of torque has been applied to the nut, the indicator is visible adjacent the back end of the nut.

8 Claims, 4 Drawing Sheets

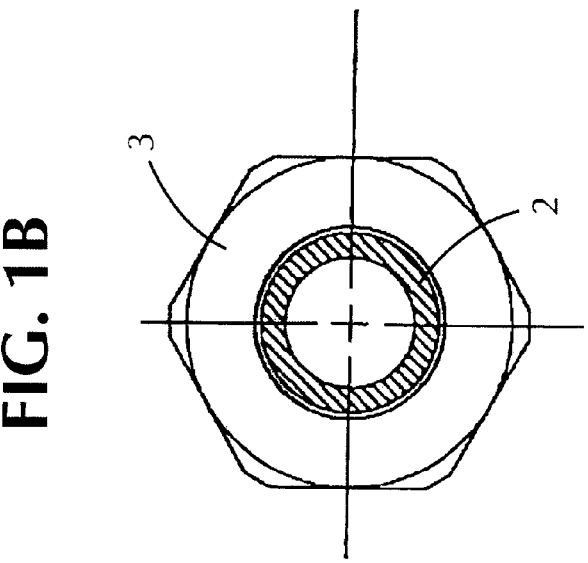
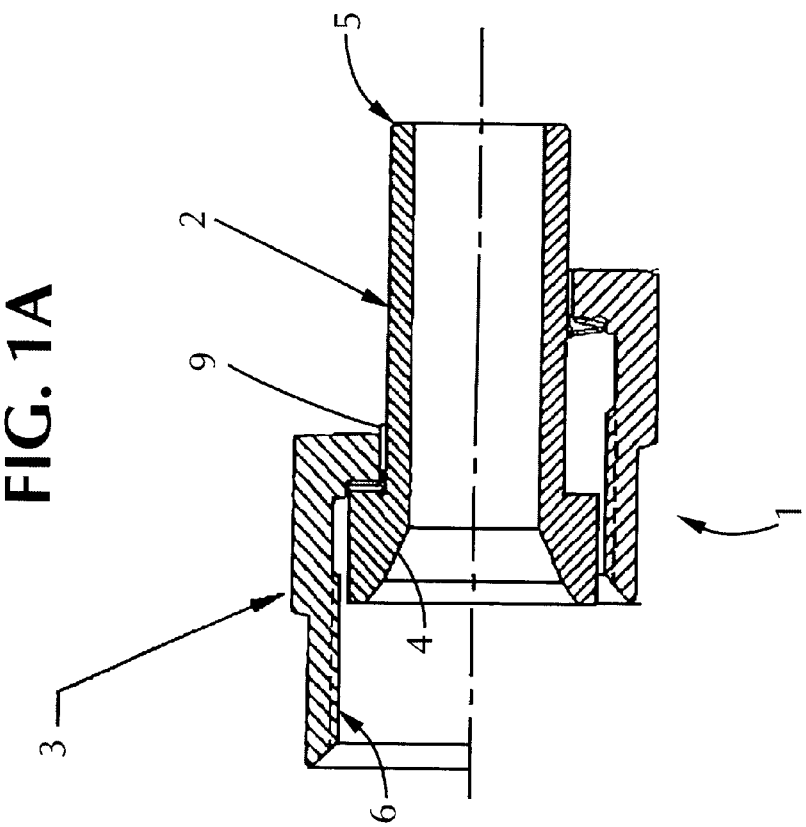

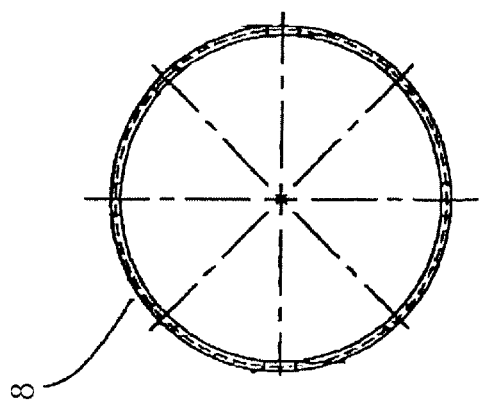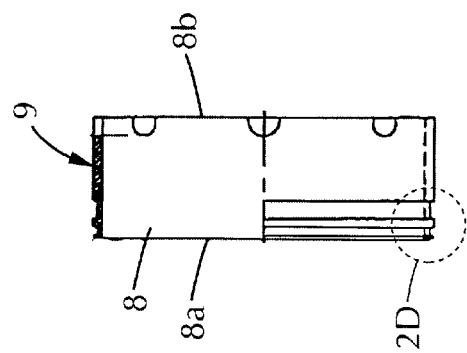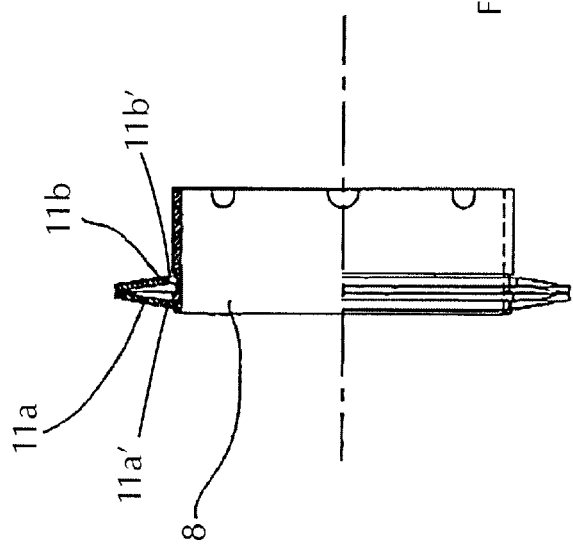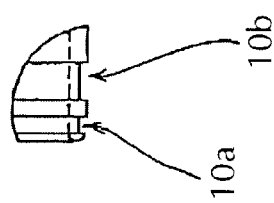

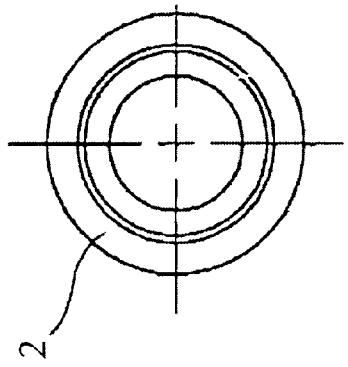
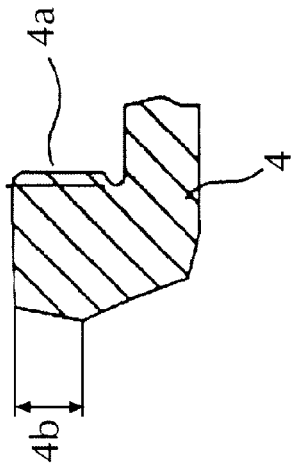
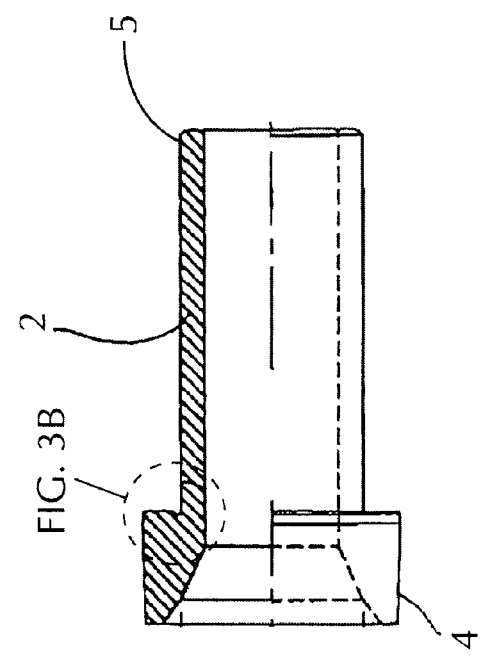

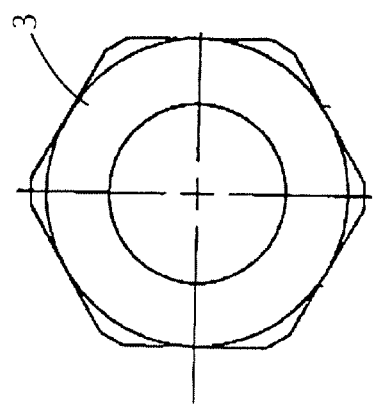
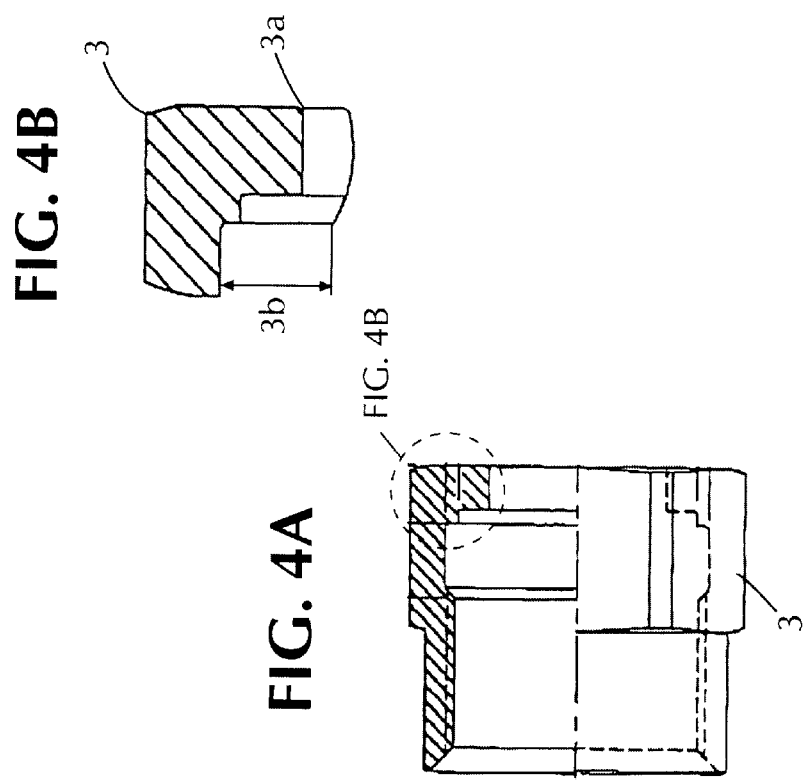

FLUID COUPLING WITH A TORQUE INDICATION DEVICE

CROSS-REFERENCE TO RELATED APPLICATION

The present application claims benefit of U.S. Provisional Application No. 60/220,522 filed on Jul. 21, 2000, the entire contents of which is incorporated herein by reference.

BACKGROUND OF THE INVENTION

FIELD OF THE INVENTION

The present invention relates to a device for visually indicating whether a fastener has been properly secured. More particularly, the present invention relates to a device which yields a continuous and permanent visual indicator that a coupling nut of a hydraulic fitting has been torqued to at least a predetermined minimum required tightening value without having to use a torque wrench.

BACKGROUND OF THE INVENTION

A problem associated with the use of nuts with fasteners and couplings is that of the nut backing out or loosening. The problem has been associated with vibrational, environmental, and other dynamic factors, which cause short-term loss of pre-load and nut back-off.

This problem is particularly apparent in the aircraft industry. In a study conducted by the Society of Automotive Engineers (SAE), 22% of fluid fittings that contained leakage were attributed to loose fittings due to nut back-off.

The prior art includes products which have tried to address the problem. For example, locking washers, spring washers, prevailing torque threads, deformed threads, plastic thread inserts, anaerobic adhesives, double-nutting, and locking pins have been used for fasteners. For fluid fittings and the like, the most common method of preventing nut loosening is by using a "safety wire", in which a length of stainless steel wire is attached to the nut of the fluid coupling via a small hole. The other end of the wire is tied to a nearby component such that the nut rotation in the loosening direction is resisted by the wire.

The safety wire device, however, is costly, since it is extremely labor intensive. A mechanic must take an extra step to insure the nut stays put by affixing the safety wire device to a nearby component after tightening the nut. Thereafter, an additional step must be taken to twist the wire to eliminate the slack. The method is also prone to produce dangerous foreign object damage, since the wires must be trimmed—the excess of which can end up in moving components causing damage. In addition, since the wires must be cut if the particular fitting requires maintenance and/or routine re-tightening, the cutting produces sharp wire ends which may snag other objects or a mechanic's hands. The wires also may break while being twisted to remove slack.

Attempts have been made to improve on the safety wire method by attempting to secure the nut to the mating half (the male half) of the coupling. One such convention device is a Moeller fitting, which provides torque resistance to the nut by positioning a pattern of torque "bumps" along the male end of the coupling and corresponding recesses positioned along the interior surface of the nut to receive these bumps when mating the male and female halves. This system, however, requires that both the male and female coupling components conform to the Moeller design; i.e., one must replace both the male and female halves in using the Moeller design.

However, industry professionals attribute the loosening of some, if not most, fluid couplings to improper tightening by a mechanic. The theory is that couplings that have failed or are going to fail were never properly secured and torqued to a minimum value in the first place. This may be attributed to an installation or maintenance mechanic simply forgetting to tighten the fitting with a torque wrench. Visually, there is no indication that a nut has been properly tightened to the appropriate torque value.

For now, an inspector must go through and check all fittings with a torque wrench to insure that they are secured at the proper torque value. Accordingly, additional time and labor must be spent to adequately insure that fittings have been correctly tightened.

Accordingly, there exists a need for a way to ensure that a nut of a fluid fitting has been properly tightened to a particular torque value, to avoid the additional time and costs associated with checking these fittings and avoiding system leakage and/or loss of function caused by fittings which have not been fully tightened coming loose.

SUMMARY OF THE INVENTION

The present invention presents a new and unique device for providing both visual indication to signify that the nut of a fluid fitting has been properly torqued, and which also provides anti-loosening characteristics to combat loosening of the nut during use.

The present invention yields a continuous and permanent visual indicator for indicating that a coupling nut of a hydraulic fitting has been torqued to at least a predetermined minimum required tightening value, without a mechanic having to use a torque wrench.

It is an object of the present invention to provide a visual torque indication device for a fluid fitting assembly.

It is another object of the present invention to provide resistance to loosening of the nut from the fitting assembly.

It is another object of the present invention to provide a fitting assembly in which the nut resists back-off.

It is another object of the present invention to provide a torque indication device for a fluid fitting assembly which can be retrofitted to existing fittings.

To accomplish the foregoing objects and advantages, one aspect of the current invention provides a fluid coupling capable of indicating proper tightening includes a fitting body having a flared end with a back side. The fitting body also includes an indicator means spaced a predetermined distance away from the back side. A threaded nut is positioned around the fitting body adjacent the flared end and includes a back end and a shoulder portion spaced away a predetermined distance therefrom. The shoulder portion is concentrically aligned with the back side of the flared end. The fluid fitting also includes a belleville(s) washer positioned around the fitting body adjacent the back side of the flared end. Upon threading and torquing of the nut onto the threaded end of a mated fitting, a first side of the belleville washer engages the back side of the flared end and a second side of the belleville washer engages the shoulder portion of the nut resulting in the compression of the belleville washer. When a predetermined amount of torque has been applied to the nut, the indicator means is visible adjacent the back end of the nut.

An additional aspect of the present invention includes, in addition to the features recited above, a sleeve surrounding the fitting body. The sleeve has a first end positioned adjacent the back side of the flared end and a second end spaced apart therefrom. The compression of the belleville washer after a predetermined amount of torque has been applied to the nut results in the second end of the sleeve protruding from the back end of the nut.

These and other aspects and objects, and many of the attendant advantages of this invention will be readily appreciated and understood by reference to the following detailed description when considered in connection with the accompany drawings.

BRIEF DESCRIPTION OF THE DRAWINGS

FIGS. 1A–1B illustrate a fluid coupling with a torque indication device according to an embodiment of the present invention.

FIGS. 2A–2D illustrate the torque indication device according to an embodiment of the present invention.

FIGS. 3A–3C illustrate the fitting body of the fluid coupling used with the torque indication device according to the present invention.

FIGS. 4A–4C illustrate the nut of the fluid coupling used with the torque indication device according to the present invention.

DETAILED DESCRIPTION OF THE PREFERRED EMBODIMENTS

FIGS. 1A–4C of the present invention represent a hydraulic B-nut fitting. However, one skilled in the art will appreciate that the present invention may be used with other types of fittings found in the prior art.

With reference to FIGS. 1A–4C, it will be seen that a female assembly for a fluid coupling 1 includes a tube body 2 positioned within a nut 3. The female assembly, both the tube body 2 and nut 3, may be manufactured from any high strength materials including plastics, metal alloys or composites thereof, and preferably made from a high strength metal alloy. As shown in FIGS. 3A and 3B, the tube body 2 is a cylindrical hollow tube which includes an enlarged (flared) end 4 (front end) forming a shoulder portion 4b, thereunder, for the female assembly. The enlarged (flared) end 4 of the tube body 2 includes a back side 4a. The other end (rear end) 5 of the female assembly is mated to a hose or pipe (not shown) carrying fluid or gas to be passed through the fluid coupling 1.

The nut 3 of the female assembly includes an internal threaded portion 6 provided for on the front end of the nut 3 and an internal circumferential collar positioned between the front end and rear end of the nut 3. As shown in FIG. 1A, the circumferential collar is smaller in diameter than the enlarged end 4 of the tube body 2 to insure that when the tube body 2 is placed therein, it can slide in one direction only relative to the nut 3.

A sleeve 8 is positioned within the diameter of the collar, and includes an inner diameter designed to be slightly larger than the outer diameter of the fitting body 2, so that a sleeve 8 may be positioned within the internal diameter. The outer diameter of the sleeve 8 corresponds to the circumferential collar of the nut 3. In that way, the sleeve 8 initially moves with the nut 3 relative to the fitting body 2.

Provided on the back end 8b (also referred to as a "second end of the sleeve") of the sleeve 8 is a torqued indicator marker 9 in the form of a curved recess in the outer wall. One or more may be used, and other types of markers may be used, for example, a painted stripe, or circumferential groove 10a, 10b.

As shown in FIGS. 2A and 2B, the sleeve 8 includes two outer circumferential grooves 10a, 10b near a first end 8a of the sleeve 8 that are positioned adjacent the flared end 4 of the fitting body 2 upon assembly of the female assembly. The inner diameter of a belleville washer 11a, 11b is received by each one of the grooves 10a, 10b. The outer diameters of the belleville washers 11a, 11b are positioned next to one another and include a first side 11a' of the belleville washer that engages the back side 4a of the flared end 4 and a second side 11b' of the belleville washer 11b that engages the shoulder portion 3b of the nut 3 resulting in the compression of the belleville washers 11a, 11b.

The inner diameters of the washers 11a, 11b are slightly larger than the outer diameter of the sleeve 8, but less than the diameter of the groove 10a, 10b. Thus, once the washers 11a, 11b are pressed onto the sleeve 8 and received within each respective groove 10a, 10b, the washers 11a, 11b cannot easily be disassembled therefrom.

The groove 10a positioned immediately adjacent the first end 8a of the sleeve 8 has a width substantially equal to approximately the thickness of the belleville washer 11a positioned therein. The width of the second groove 10b is larger, allowing the belleville washer 11b positioned therein to move. Preferably, the width of the second groove 10b is approximately 1–1.5 times the width of the first groove 10a, and most preferably approximately greater than 1.5 times the width of the first groove 10a. The width of the second groove 10b allows the sleeve 9 to move relative to the nut 3 when the nut 3 is tightened onto a mated fitting.

After the washers 11a, 11b have been assembled onto the sleeve 8, the sleeve 8 is positioned within the collar of the nut 3. The sleeve 8 is positioned within the collar so that it is retained therein, but able to move if a small force is applied. The sleeve 8 is positioned in such a way within the collar, the outer diameter of the belleville washer 11a located adjacent the back end 3a of the nut 3 is positioned substantially adjacent to the shoulder portion 3b of the collar. The nut 3 is then slipped over a non-flared end of a fluid tube, with the threads 6 facing toward a flared end 4 of the tube 2.

When a mated fitting (male fitting) is brought together with the female assembly for mating, the nut 3 is threaded on the male fitting and tightened to the required torque (as shown in FIG. 4A). As the nut 3 is tightened onto the male threads, the belleville washers 11a, 11b are compressed together. This causes the sleeve 8 to slide away from the mated fitting, out the back end 3a of the nut 3. The arrangement of the belleville washers 11a, 11b, the size of the grooves 10a, 10b, and the placement of the torqued indicator markers 9 are configured in such a way, that when the bottom of the torqued indicator markers 9 are visible from the back end 3a of the nut 3, the proper amount of torque has been applied to the fitting assembly.

When the torqued indicators 9 are fully visible, it is preferable that the inner diameter of the belleville washer 11b within the second groove 10b be adjacent the leading edge of the second groove 10b. When this occurs, the amount of torque that must be applied to the nut 3 to rotate it increases substantially, yielding another indication that the nut 3 has been properly torqued (in addition to the visual torqued indicator).

In a preferred embodiment of the present invention, the sleeve 8 is brightly colored so that it can be readily visible from a distance and at any angle.

As an added benefit, the force generated by the compressed belleville washers 11a, 11b helps prevent unwanted loosening of the nut 3 off the mated fitting during use.

It will be appreciated by one of ordinary skill in the art that the nut 3 and fitting body 2 as disclosed are substantially similar to standardized parts. They are only modified to provide adequate fit of the spring assembly (sleeve 8 and washers 11*a*, 11*b*) and to promote maximum visibility of the sleeve 8 when it protrudes from the back end 3*a* of the nut 3. Thus, it is preferable that the nut 3 include a substantially sharp corner at the intersection of the internal bore and the back end.

In another embodiment of the present invention, the sleeve 8 is replaced by an indicator 9 positioned at a particular distance from the flared end 4 of the tube on the fitting body 2. In this embodiment, one or more belleville washers 11*a*, 11*b* are used, and are positioned between the shoulder portion 3*b* of the collar of the nut 3 and the back side 4*a* of the flared end 4. Preferably, the outer diameters of the washers 11*a*, 11*b* are positioned within a groove 10*a*, 10*b* of the nut 3 which retains the washers 11*a*, 11*b* so they do not come disassembled from the nut 3 when the nut 3 is not positioned on the fitting body 2.

In this embodiment, as the nut 3 reaches the proper torque value, the indicator 9 positioned on the fitting body 2 becomes visible out the back end 3*a* of the nut 3.

The indicator 9 may be a painted mark, a recess 12, a protruding member, and the like. It is preferable that all indicator marks be brightly colored so that they can be readily seen from a distance and at any angle. Other embodiments of the invention may include indicators 9 having luminescence properties, so that they are visible in low light or darkness, or that they illuminate when exposed to a particular type of light (i.e., black light).

Accordingly, the torque indication device according to the present invention allows for a continuous and permanent visual indicator that a coupling nut 3 of a hydraulic fitting has been torqued to at least a predetermined minimum required tightening value.

While the present invention for a torque indication device for use with fitting assembly, and variations thereof, are described in detail herein, it should be apparent that the disclosure and teachings of the present invention will suggest many other alternative designs to those skilled in the art. Accordingly, the present invention is not limited to the foregoing description.

What is claimed is:

1. A torque indication device for a fluid coupling comprising:
   a sleeve for surrounding a fitting body of a fluid coupling, said fitting body having a longitudinal axis and having a flared end, said flared end having a front side and having a flared opening at said front side, and having a back side spaced apart from said front side by a distance parallel to said longitudinal axis, said sleeve having a first end of said sleeve positioned adjacent said back side of said flared end and a second end of said sleeve spaced apart therefrom; and
   a first belleville washer positioned around said fitting body between said back side of said flared end of said fitting body and a shoulder portion of a nut,
   wherein upon threading and torquing of the nut of said fluid coupling onto the threaded end of a mated fitting, a first side of said belleville washer engages said back side of said flared end and a second side of said belleville washer engages said shoulder portion of the nut resulting in the compression of said belleville washer, and wherein when a predetermined amount of torque has been applied to the nut, a said second end of said sleeve protrudes from the back end of the nut to indicate proper tightening.

2. A fluid coupling capable of indicating proper tightening, comprising:
   a fitting body having a longitudinal axis and having a flared end, said flared end having a front side and having a flared opening at said front side, and having a back side spaced apart from said front side by a distance parallel to said longitudinal axis, said fitting body also including an indicator;
   a threaded nut positioned around said fitting body adjacent said flared end, said nut including a back end and a shoulder portion spaced away a predetermined distance therefrom, wherein said shoulder portion is coaxially aligned with said back side of said flared end and positioned such that said back side of said flared end is intermediate between said front side of said flared end and said shoulder portion; and
   a belleville washer positioned around said fitting body between said back side of said flared end of said fitting body and said shoulder portion,
   wherein upon threading and torquing of said nut onto the threaded end of a mated fitting, a first side of said belleville washer engages said back side of said flared end and a second side of said belleville washer engages said shoulder portion of said nut, resulting in the compression of said belleville washer, and wherein when a predetermined amount of torque has been applied to said nut, said indicator is visible adjacent said back end of said nut, and
   wherein said indicator comprises a sleeve surrounding said fitting body adjacent said flared end, said sleeve including a back end of said sleeve which projects out from said back end of said nut when said predetermined amount of torque has been applied.

3. The fluid coupling according to claim 2 wherein said indicator comprises a colored marker applied to a surface of said fitting body.

4. The fluid coupling according to claim 2 wherein said indicator comprises a recess in said fitting body adjacent said back end of said nut.

5. A fluid coupling capable of indicating proper tightening, comprising:
   a fitting body having a longitudinal axis and having a flared end, said flared end having a front side and having a flared opening at said front side, and having a back side spaced apart from said front side by a distance parallel to said longitudinal axis;
   a threaded nut positioned around said fitting body adjacent said flared end, said nut including a back end and a shoulder portion spaced away a predetermined distance therefrom, wherein said shoulder portion is coaxially aligned with said back side of said flared end and positioned such that said back side of said flared end is intermediate between said front side of said flared end and said shoulder portion;
   a sleeve surrounding said fitting body, said sleeve having a first end of said sleeve positioned adjacent said back side of said flared end and a second end of said sleeve spaced apart therefrom; and
   a first belleville washer positioned around said fitting body between said back side of said flared end of said fitting body and said shoulder portion,
   wherein upon threading and tightening of said nut onto the threaded end of a mated fitting, a first side of said belleville washer engages said back side of said flared end and a second side of said belleville washer engages said shoulder portion of said nut, resulting in the compression of said belleville washer, and wherein when a predetermined amount of torque has been applied to said nut, said second end of said sleeve protrudes from the back end of said nut indicating that said nut has been properly tightened.

6. The fluid coupling according to claim 5, wherein said sleeve includes a groove adjacent said first end of said sleeve, said groove receiving said inner diameter of said belleville washer.

7. The fluid coupling according to claim 5, said coupling further comprising one or more additional belleville washer(s) positioned immediately adjacent said first belleville washer, wherein the travel of said sleeve is amplified by the addition of said additional belleville washer(s).

8. The fluid coupling according to claim 6, further comprising a second belleville washer, wherein said sleeve includes a second groove spaced apart from said first groove, for receiving the inner diameter of said second belleville washer.

* * * * *